May 17, 1960   F. B. WILLIAMS   2,936,581
VARIABLE AREA EXHAUST NOZZLE CONTROL SYSTEM
Filed June 6, 1958
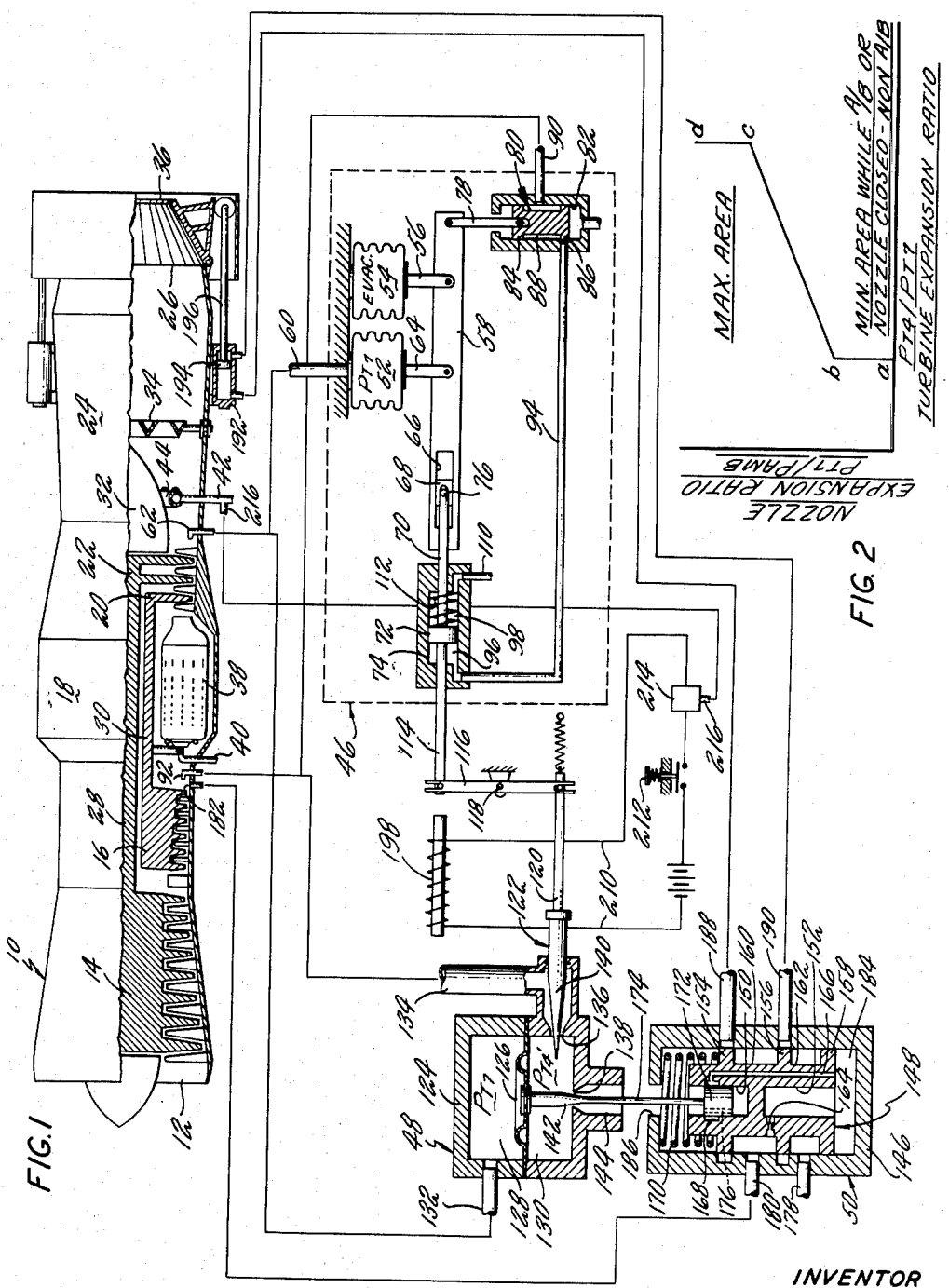
INVENTOR
FRANK B. WILLIAMS
BY
ATTORNEY

United States Patent Office 2,936,581
Patented May 17, 1960

2,936,581

VARIABLE AREA EXHAUST NOZZLE CONTROL SYSTEM

Frank B. Williams, West Palm Beach, Fla., assignor to United Aircraft Corporation, East Hartford, Conn., a corporation of Delaware Application June 6, 1958, Serial No. 740,314

1 Claim. (Cl. 60—35.6)

This invention relates to afterburning jet engines, more particularly to a control system for a variable area exhaust nozzle on an afterburning jet engine.

Analysis of advanced jet engine requirements for varying exhaust nozzle area while afterburning has indicated the desireability of scheduling nozzle area as a function of over-all nozzle pressure ratio. Since over-all turbine expansion ratio is an indication of nozzle area, the desired results may be obtained by scheduling turbine expansion ratio as a function of nozzle expansion ratio. Utilizing turbine expansion ratio as an indication of nozzle area eliminates the need for a mechanical nozzle area feed-back in the control system.

The control system of this invention utilizes the output of a pressure ratio indicator to drive a movable pintle in a pressure ratio control element. By proper selection of the linkage and the contouring of the movable pintle, any desired relationship of turbine expansion ratio vs. nozzle expansion ratio can be obtained.

An object of this invention is to provide an improved control system for a variable area exhaust nozzle on an afterburning jet engine.

Another object of the invention is to provide a pressure ratio responsive control system for scheduling the area of a variable area exhaust nozzle.

Another object of the invention is to eliminate the mechanical nozzle area feedback in a control system for a jet engine variable area exhaust nozzle.

Still another object of the invention is to provide a mechanical input signal from an exhaust nozzle expansion ratio indicator to a turbine expansion ratio control to schedule exhaust nozzle area as a function of over-all nozzle expansion ratio.

Other objects and advantages will be apparent from the following specification and claim, and from the accompanying drawing which illustrates an embodiment of the invention.

In the drawing:

Fig. 1 shows an afterburning jet engine having the exhaust nozzle area control system of my invention incorporated therewith.

Fig. 2 is a plot of turbine expansion ratio vs. nozzle expansion ratio with an exhaust nozzle area schedule indicated thereon.

Referring to the drawing in detail, the jet engine is indicated generally at 10, the engine having inlet 12, low pressure compressor rotor 14, high pressure compressor rotor 16, combustion section 18, high pressure turbine rotor 20, low pressure turbine rotor 22, afterburner 24 and variable area exhaust nozzle 26 in succession in the direction of gas flow through the engine. Compressor rotor 14 is connected to turbine rotor 22 by means of shaft 28 to form a low pressure spool. Compressor rotor 16 is connected to turbine rotor 20 by sleeve 30 to form a high pressure spool, the spool surrounding shaft 28 and being coaxial therewith. Exhaust cone 32 is mounted downstream of the last stage of turbine rotor 22 at the inlet to afterburner 24. The afterburner includes flameholder 34 and iris diaphragm 36 for varying the area of the exhaust exit.

Fuel for combustion section 18 is fed to one or more burners 38 through conduit 40 from a source not shown. Fuel for the afterburner is supplied from the same source through conduit 42 to annular manifold 44 in the afterburner.

The control system for regulating the position of the iris plates in diaphragm 36 to vary exhaust nozzle area comprises pressure ratio indicator 46, pressure ratio control 48 and air shuttle valve assembly 50.

A pair of bellows 52 and 54 are mounted within a chamber in pressure ratio indicator 46, the chamber being vented to atmospheric pressure, $P_{AMB}$. Bellows 54 is evacuated and its free end is connected by rod 56 to an intermediate portion of lever 58. The interior of bellows 52 is connected by conduit 60 to total pressure station 62 within engine 10 downstream of low pressure turbine rotor 22. The pressure sensed by this station is turbine discharge pressure, $P_{T7}$. The free end of bellows 52 is connected by rod 64 to an intermediate portion of lever 58.

The left end of lever 58 includes guide 66 in which block 68 is slideably positioned. The block is connected to rod 70, which in turn is connected to piston 72 in cylinder 74, and the connection of the rod to the block forms adjustable pivot 76 about which lever 58 rotates under the influence of expansions and contractions of bellows 52 and 54. The right end of lever 58 is connected by link 78 to pilot valve 80 in cylinder 82. The pilot valve has lands 84 and 86 at opposite ends therefore, and groove 88 therebetween. Compressor discharge total pressure $P_{T4}$, is admitted to groove 88 by conduit 90 which is connected to total pressure station 92 within engine 10 downstream of high pressure compressor rotor 16.

Land 86 on pilot valve 80 controls the entrance to passage 94 and the admission of compressor discharge pressure through the passage to chamber 96 in cylinder 74 at the left of piston 72. Chamber 98 at the right of the piston is connected by passage 110 to a suitable vent pressure, the chamber containing spring 112 loading piston 72 to the left.

Rod 114 is connected to piston 72 and extends in a direction opposite to rod 70, also connected to the piston. The outer end of rod 114 is connected to the upper end of lever 116. The lever is mounted to rotate about fixed pivot 118, and its lower end is connected to extension 120 on movable pintle 122 in pressure ratio control 48.

Pressure ratio control 48 provides a mechanical displacement output signal which indicates an error from the scheduled ratio between compressor discharge pressure and turbine discharge pressure, $P_{T4}/P_{T7}$. Control casing 124 has flexible diaphragm 126 therein, the diaphragm defining upper chamber 128 and lower chamber 130 within the casing. Upper chamber 128 is connected by branch conduit 132 to total pressure station 62 within engine 10 to admit turbine discharge pressure, $P_{T7}$, to the chmaber. Lower chamber 130 is connected by branch conduit 134 to total pressure station 92 within engine 10 at the discharge end of compressor 16. Compressor discharge pressure, $P_{T4}$, in branch conduit 134 is bled through a series of two orifices, 136 and 138, to generate a reference pressure $P_{T4}$, in lower chamber 130 which will act on the bottom face of diaphragm 126 in opposition to turbine discharge pressure, $P_{T7}$, acting on the top face of the diaphragm. The area of upstream orifice 136 is controlled by needle valve 140 on movable pintle 122, the pintle being positioned by pressure ratio indicator 46 as described above, and the area of downstream orifice 138 is controlled by needle valve 142 connected to diaphragm 126. Drain passage 144 downstream of orifice 138 is connected to a suitable low pressure.

Air shuttle valve assembly 50 includes hollow casing 146 containing shuttle valve 148. The shuttle valve has upper bore 150 and lower bore 152 internally thereof, and three spaced lands, 154, 156 and 158, about its outer surface. Groove 160 is defined between lands 154 and 156, and groove 162 is defined between lands 156 and 158. Bleed passage 164 provides restricted communication between groove 160 and lower bore 152, and passage 166 extends lengthwise through the shuttle valve between its lower face and annulus 168 in upper bore 150. Spring 170 is positioned between casing 146 and the upper face of land 154 and urges the shuttle valve in a downward direction.

Pilot valve 172 is slideably positioned in upper bore 150 of the shuttle valve and is connected by extension 174 to needle valve 142 so that the pilot valve is translated in accordance with changes in position of diaphragm 126. Passage 176 extends lengthwise through the pilot valve to provide a pressure balance across the pilot valve.

Ambient pressure, $P_{AMB}$, is admitted by conduit 178 to groove 162, and compressor discharge static pressure, $P_{S4}$, is admitted by conduit 180, connected to static pressure station 182 in engine 10 at the discharge of compressor 16, to groove 160. The pressure air in groove 160 is admitted through bleed passage 164 to bore 152 and chamber 184 at the bottom of shuttle valve 148. The upper edge of pilot valve 172 cooperates with the upper edge of annulus 168 to define an opening controlling the bleeding of pressure air from chamber 184 below the shuttle valve through passage 166, bled pressure air being discharged through opening 186 to a suitable drain. Through control of the pressure in chamber 184, there is for every position of pilot valve 172 a position of equilibrium for shuttle valve 148, in which equilibrium position the pressure in chamber 184 equals the loading of spring 176.

Land 154 controls the opening into conduit 188 and land 156 controls the opening into conduit 190, the conduits being connected to actuating mechanism for varying the position of the iris plates in diaphragm 36 as will be explained. The shuttle valve is shown in its null position in which the openings into both conduits are completely blocked by the lands. Conduit 188 is connected to the left end of cylinder 192 containing power piston 194, and conduit 190 is connected to the right end of the cylinder. Rod 196 connects the power piston and iris diaphragm 36. When air shuttle valve 148 moves upward from the null position shown, compressor discharge pressure is admitted from shuttle valve groove 160 to conduit 188 and the left end of cylinder 192. This pressure will move power piston 194 to the right to close iris diaphragm 36 and decrease exhaust nozzle area. At the same time that pressure air is being admitted to the left end of cylinder 192, conduit 190 and the right end of the cylinder are connected to ambient pressure through shuttle valve groove 162 and conduit 178. When the shuttle valve moves downward from the null position shown, compressor discharge pressure is admitted from grove 160 to conduit 190 and the right end of cylinder 192 to move power piston 194 to the left to open iris diaphragm 36 and increase exhaust nozzle area. At the same time the left end of the cylinder is connected to drain pressure through opening 186.

Overriding solenoid 198 is provided for opening iris diaphragm 36 before the afterburner is ignited. Electrical circuit 210 for the solenoid includes switch 212 which is operatively connected with the pilot's power lever, not shown, and a normally closed pressure switch 214 which preferably is located at the afterburner igniter, not shown. When afterburning is selected power lever switch 212 closes to actuate the solenoid and force rod 114 and piston 72 to the right against the loading of spring 112. This movement rotates lever 116 in a clockwise direction to move needle valve 140 on movable pintle 122 into orifice 136. The pressure in chamber 130 is reduced with the result that diaphragm 126 and operatively connected pilot valve 176 are moved downward to cause an "open" signal to be given by air shuttle valve assembly 50 to iris diaphragm 36. This signal continues until afterburner fuel conduit 42 is filled with fuel. Branch conduit 216 connecting conduit 42 and pressure switch 214 transmits a fuel pressure signal to the pressure switch to open it and break the solenoid circuit. Normal operation of the control system is restored and the system can then regulate exhaust nozzle area to obtain the correct $P_{T4}/P_{T7}$.

*Operation*

In considering operation of the control system, it will be assumed that the engine is running and that the afterburner has been lighted. Pressure ratio indicator 46 functions in the following manner. If turbine discharge pressure, $P_{T7}$, within bellows 52 is assumed to increase, with ambient pressure remaining constant, lever 58 will be rotated in a clockwise direction about pivot 76. Link 78 and pilot valve 80 will move downward and compressor discharge pressure, $P_{T4}$, will be admitted from groove 88 surrounding the pilot valve to passage 94 and chamber 96 at the left of piston 72. The relatively high pressure in chamber 96 will move the piston and stick 68 to the right. This movement decreases the lever arm of the force exerted by bellows 52 and eventually pilot valve 80 will be returned to its original position with pivot 76 in its new position according to the new $P_{T7}/P_{AMB}$.

Operation of pressure ratio control 48 will next be considered, and movable pintle 122 will be assumed to be fixed. This gives a simple Microjet with two choked orifices in series with the area of each orifice fixed, the area of orifice 136 being fixed by the position of needle valve 140 on movable pintle 122 and the area of orifice 138 being fixed because the control is a null-position type. Air flow through the orifices may be expressed as:

$$W_M = \frac{K_1 a_1 P_{T4}}{\sqrt{T_M}} = \frac{K_2 a_2 P_{T4}'}{\sqrt{T_M}}$$

where $K_1$ and $K_2$ are flow coefficients, $a_1$ and $a_2$ are the areas of orifices 136 and 138, respectively, and $T_M$ is the temperature of the air entering the pressure ratio control. Then:

$$\frac{P_{T4}}{P_{T4}'} = \frac{K_2 a_2}{K_1 a_1}$$

Since $P_{T4}'$ is balanced across diaphragm 126 by $P_{T7}$, for any given area of orifice 136 ($a_1$) needle valve 142 will be in its null position for a certain $P_{T4}/P_{T7}$. As the area of orifice 136 is decreased needle valve 142 will be in its null position for a higher $P_{T4}/P_{T7}$. From this it should be obvious that by feeding the output of pressure ratio indicator 46 through the proper linkage to movable pintle 122, and by the proper contouring of needle valve 140 on the movable pintle, any desired relationship of $P_{T4}/P_{T7}$ to $P_{T7}/P_{AMB}$ can be obtained. Operation along line $a$—$b$ of Fig. 2 is provided by a stop for piston 72 in pressure ratio indicator 46. This stop may be the abutting of piston 72 against the left wall of chamber 96. The stop fixes the position of movable pintle 122 for all values of $P_{T7}/P_{AMB}$ below point $b$ on Fig. 2. Operation along line $b$—$c$ will commence when $P_{T7}/P_{AMB}$ becomes sufficient to start moving pivot 76 to the right and inserting movable pintle 122 into pressure ratio control 48 to reduce the area of orifice 136. The result will be that the pressure ratio control will regulate about a new $P_{T4}/P_{T7}$.

The output from pressure ratio control 48 is transmitted to air shuttle valve assembly 50 by virtue of the operative connection between diaphragm 126 in the control and pilot valve 176 in the valve assembly. Assuming that $P_{T7}$ becomes greater than $P_{T4}'$ the diaphragm and the pilot valve will move down to afford an opening between the top surface of the pilot valve and the upper edge of annulus 168. Air from chamber 184 will escape through passage 166 and this opening to decrease the pressure in the chamber and allow spring 170 to push shuttle valve 148 down. The movement of the shuttle valve vents the left end of cylinder 192 in the iris diaphragm actuating mechanism and admits high pressure air to the right end of the cylinder to open the exhaust nozzle. The resultant increase in exhaust nozzle area decreases $P_{T7}$ and diaphragm 126 will move upward to its neutral position. As pilot valve 172 moves upward it closes the opening with annulus 168 to increase the pressure in chamber 184 on the bottom of shuttle valve 148. The increased pressure moves the air shuttle valve upward to its original position. Should the iris diaphragm close too far, the reverse procedure would occur and the exhaust nozzle area would be increased again. Thus, the iris diaphragm will minutely hunt about a certain position to maintain a scheduled $P_{T4}/P_{T7}$. In the event of an afterburner lean-out or an afterburner blow-out the iris diaphragm would close instantly to maintain the scheduled $P_{T4}/P_{T7}$.

It is understood that the invention is not limited to the specific embodiments herein illustrated and described, but may be used in other ways without departure from its spirit as defined by the following claim.

I claim:

In combination with a jet engine having a compressor, a turbine, an afterburner, an afterburner fuel system, an exhaust nozzle and means for varying the area of said nozzle, control means including two orifices in series, flexible means connected to valve means controlling the area of the downstream of said orifices, said flexible means being responsive in opposite senses to turbine discharge pressure and compressor discharge pressure, and output means connected to said valve means and delivering a mechanical displacement signal as a function of the error from a scheduled ratio of turbine discharge pressure to compressor discharge pressure, said nozzle area varying means and said control output means being operatively connected, means for varying the area of the upstream of said orifices, and means for adjusting said orifice area varying means including flexible means responsive to turbine discharge pressure, flexible means responsive to ambient pressure, both of said flexible means being connected to a lever rotatable about a relatively fixed pivot, piston means connected to said pivot, an operative connection between said piston and said orifice area varying means, spring means loading said piston in one direction to shift said pivot and adjust said orifice area varying means accordingly, valve means connected to said lever, said valve means controlling the admission of compressor discharge pressure to said piston to load said piston in opposition to said spring means to shift said pivot and adjust said orifice area varying means accordingly, and solenoid means for moving said orifice area varying means in a closing direction when actuated including manually operated means for actuating said solenoid and means responsive to an afterburner fuel system pressure for interrupting solenoid actuation.

References Cited in the file of this patent

UNITED STATES PATENTS

| | | |
|---|---|---|
| 2,619,794 | Lombard | Dec. 2, 1952 |
| 2,764,868 | Watson et al. | Oct. 2, 1956 |
| 2,846,843 | Clark et al. | Aug. 12, 1958 |

OTHER REFERENCES

SAE Transactions, "A New Approach to Turbojet and Ramjet Engine Control," by Reed, vol. 64, 1956, pp. 472–485.